March 22, 1938.  G. C. ARMSTRONG  2,111,550
TIME LIMIT CONTROL
Filed Oct. 23, 1935　　2 Sheets-Sheet 1
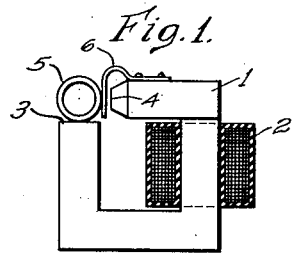
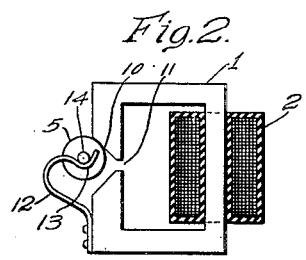
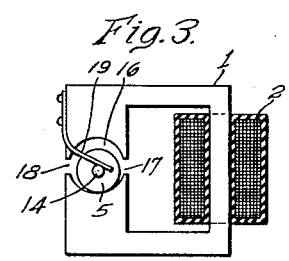
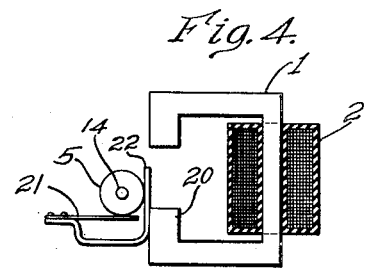
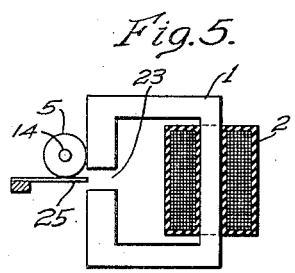
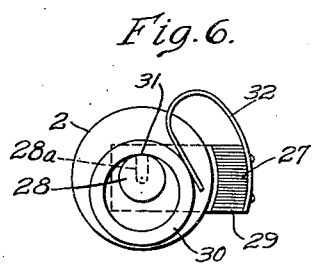
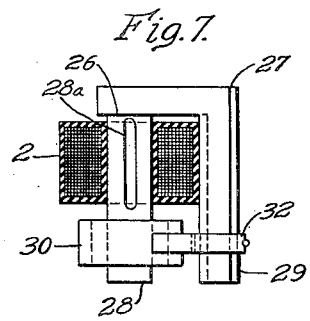
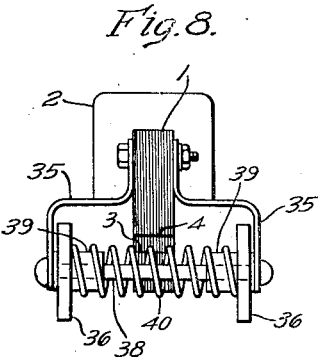
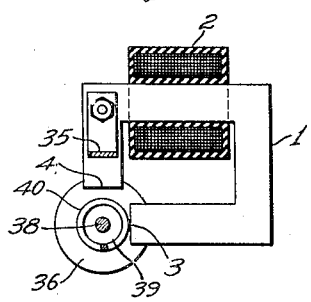
WITNESSES:
INVENTOR
George C. Armstrong.
BY
ATTORNEY INVENTOR
George C. Armstrong

Patented Mar. 22, 1938

2,111,550

UNITED STATES PATENT OFFICE 2,111,550

TIME LIMIT CONTROL

George C. Armstrong, Forest Hills, Pa., assignor to Westinghouse Electric & Manufacturing Company, East Pittsburgh, Pa., a corporation of Pennsylvania Application October 23, 1935, Serial No. 46,287

15 Claims. (Cl. 172—36)

This invention relates to electromagnetic rotary devices. Heretofore in such devices rotation has been produced directly by electromagnetic action. In this invention I have obtained rotation by an action partly electromagnetic and partly the result of friction.

Hysteresis plays an important part in the action, but the invention is not to be confounded with the so-called hysteresis motor because it does not require a rotating field. A periodic flux, oblique to the surface on which motion is to be produced, and including a reversal in its period is all that is required.

It is an object of my invention to produce rotation in the way just described and to use it for any desired purpose such as the closing of contacts, the driving of toys or other light machinery, the control of latching devices on relays and the like. In the latter use, my invention provides a very convenient time-delay device.

It is a further object of my invention to provide an inexpensive and easily manufactured electric controlling device for a prime mover.

It is a further object of this invention to take advantage of looseness in bearings which heretofore have required a good fit.

Another object of my invention is to provide a low speed motor having a high torque.

A further object of my invention is to provide a self-starting motor having a high torque particularly at starting.

It is a further object of my invention to cause an armature to have a motion both of translation and of rotation relative to a magnetic pole-face.

It is a further object of my invention to provide an electric driving device capable of being contained in a small space.

It is a further object of my invention to provide an electric driving device easily maintained in order and requiring little attention.

Figure 10:
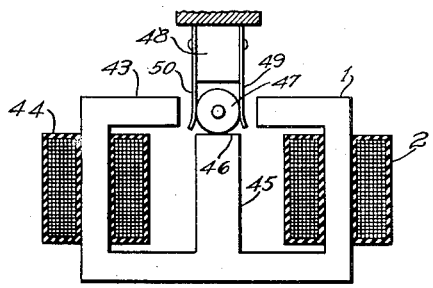
Figure 11:
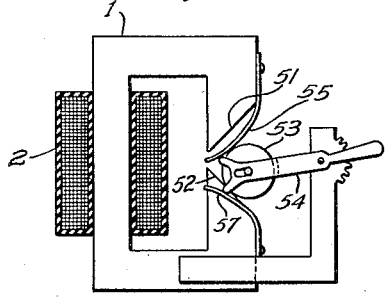
Figure 12:
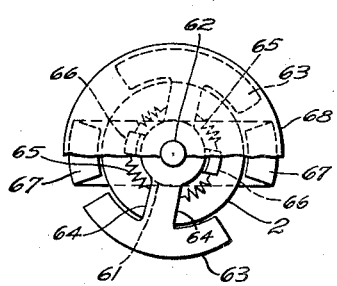
Figure 13:
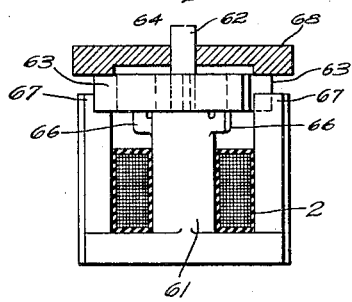
Figure 14:
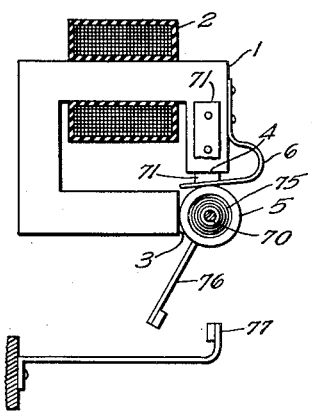
Figure 15:
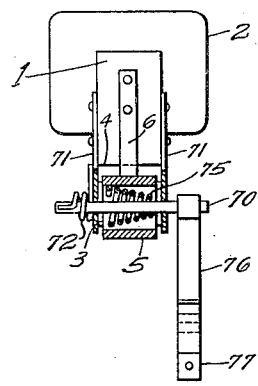

Other objects of my invention and details of construction, modifications and applications will be evident from the following description and accompanying drawings, in which Figure 1 is an elevational view partly in section of one form of my device, Figs. 2, 3, 4 and 5 show, respectively, modifications thereof, Figs. 6 and 7 are respectively a plan and an elevational view partly in section of another modification, Figs. 8 and 9 are respectively a plan and a similar elevational view of another modification, Fig. 10 shows a modification having two coils and capable of rotation in one sense or the other, according as current is supplied through the other coil, Fig. 11 shows a modification capable of rotation in one sense or the other, the sense of rotation being controlled manually, Fig. 12 shows a plan view and Fig. 13 is a vertical sectional view of another modification, Fig. 14 is an elevational view of the form illustrated in Fig. 1 showing a method of transferring the rotation from the rotor to an external device, and Fig. 15 is an elevational view of the same modification showing the transferring mechanism partly in section.

In Fig. 1, a magnetic circuit 1 is supplied with a coil 2 for energizing it with periodic flux. The circuit contains an air gap having a pole face 3 and a pole 4. Preferably, the pole 4 has a surface approximately at right angles to the pole face 3, and in a position at one side of the face 3, but any other position in which the pull exerted by the flux is not normal to the surface of the pole face 3 may be used. A cylindrical rotor 5 rests on the pole face 3. It is biased away from the pole 4 by a spring 6. As shown, this spring is mounted upon the body of the magnetic circuit but an independent mounting may be used and the spring may or may not be of magnetic material. The rotor 5 has been shown as a hollow cylinder and bearings for holding it in place have not been illustrated, because any suitable bearings may be used. A method for transferring rotation from this body to external objects is illustrated in Figs. 14 and 15 and will be explained in connection therewith.

In the operation of the device illustrated in Fig. 1, coil 2 is energized with alternating current, whereby a periodic flux is produced in the magnetic circuit.

This may be ordinary alternating flux such as is produced by sinusoidal current in the coil, but other forms of periodic flux may be used, provided it reverses its direction. One convenient way of producing such flux would be to combine a coil carrying direct current with the coil shown. The strength of the flux produced by the direct current must not be great enough to prevent the alternating current from reversing the resultant flux.

Intermittent current may be combined with direct or alternating current to produce various forms of flux subject to the condition that the flux reverses.

When the coil or coils upon the magnetic circuit are energized, periodic flux occurs between the pole faces 3 and 4 and under the influence of this flux and of the spring 6, the cylinder 5 will both move to and fro and rotate. At the beginning of the movement, various transients occur, but when the motion has become steady, the member 5 will be in its extreme left-hand position at the time the flux is exerting the greatest pull. This is in accordance with the usual action of bodies oscillating steadily. The reversal of motion occurs at the time of greatest force, because it is the time of greatest acceleration.

As the body 5 moves from its extreme left-hand position, friction between it and the pole piece 3 causes it to rotate. It will reach the extreme right-hand position at or about the time that the flux in the gap 3—4 falls to zero. This will be the moment of reversal of flux in the core 1, but it will not be the time of reversal of flux in the body 5 because the hysteresis of the material of the cylinder 5 requires that the flux in the gap shall reverse and then rise to a sufficient intensity to provide the coercive force needed to reverse the magnetism of the cylinder 5 before the magnetism of the cylinder will reverse.

The pole 3 and the adjacent portions of the cylinder 5 will at the moment after reversal of flux in the gap, be of the same polarity. There will, therefore, be some repulsion between them. Consequently, the cylinder 5 will move under the influence of the spring 6 without being caused to roll. That is, it will slide toward the left during at least part of the time it is moved by the spring. Also during the motion toward the right, the cylinder will have acquired a certain rotational momentum. This will cause its rotation to persist during the motion toward the left until its magnetism has been reversed and there is again attraction between it and the end of the pole face 3. The friction resulting from this attraction must first overcome the rotational momentum before it can reverse the direction of rotation of the cylinder.

The cylinder arrives at its left-hand position either with no rotation at that instant or with a rotation smaller, although in the opposite sense to that it possessed at the time it reached the extreme right-hand position. The result is an accumulation of rotational movement in the clockwise direction. This movement may be used to drive any apparatus connected to the cylinder, the connection being afforded in any suitable way. One way is explained in connection with Figs. 14 and 15.

In the form illustrated in Fig. 2, the magnetic circuit, which is energized from the coil 2 in the way already explained, results in a motion of the rotor 5 along a pole face 10 toward and from the small part 11 of the air gap. The motion away being provided by the action of a spring 12, the spring 12 has been bent to afford a bearing 13 for one end of a shaft forming part of the rotor 5. The rotor 5 has been shown in this figure as a solid cylinder with hubs 14, but a hollow cylinder as illustrated in Fig. 1 can be used. Any suitable device for conveying the rotation to an external object may be attached to either the hub 14 or to the other end of the shaft. The operation of this device is in other respects like that described in connection with Fig. 1.

In Fig. 3, the magnetic circuit 1 energized by the coil 2 contains an air gap 16 approximately circular. The rotor body being shaped like that in Fig. 2 is loosely held by its bearings in a position nearer the narrow gap 17 than it is to the gap 18. These may be loose bearings or spring bearings yieldably holding the hubs 14 in the illustrated position, but if preferred, instead of a solid cylinder, a hollow cylinder may be employed and spring connected to an axle as illustrated in Fig. 15. When the magnetic flux becomes strong enough, the body is moved toward the gap 17 against the pressure of a spring 19; the bearings are yielding enough to permit the motion and it is accompanied by a rolling action. The transfer of the rotation to external objects is accomplished as in the other forms.

In the form shown in Fig. 4 the rotating body 5 is shown with a hub 14 which may serve as a means for taking off the rotation and also may cooperate with bearings to loosely position the body. A non-magnetic supporting surface 22 restrains the body from entering into the gap in the magnetic circuit 1. When the magnetic flux is attracting the body, the tendency is for the body to move toward the nearer pole 20 and in trying to do this it rolls along the surface 22. A spring 21 returns the body to its original position. The combined effect of the two produces rotation in the way described.

In the form illustrated in Fig. 5, the body 5 rolls upon the surface of the magnetic circuit 1 toward the air gap 23, being opposed in its motion by a spring 25. In this form or in the form shown in Fig. 4 a hollow cylinder and a connecting spring illustrated in Fig. 15 may be substituted for the solid cylinder with hubs if desired.

In the form illustrated in Figs. 6 and 7, the magnetic circuit 27 contains a cylindrical pole piece 28 and an arcuate pole piece 29, the coil 2 being energized with periodic current. The pole piece 28 is preferably solid and slotted over a portion of its length, as at 28a, to reduce losses, but the rest of the magnetic circuit is laminated. The junction of the two is shown at 26. The magnetic ring 30 contacts the pole piece 28 at one point 31. A spring 32 which is shown as mounted on the pole piece 29, contacts the ring 30 and biases it away from the pole piece 29.

In the operation of this device, when the flux is sufficient to overcome the spring, it moves the ring 30 by the attraction between the ring and the pole piece 29, the movement tending to diminish the air gap. During this movement, the attraction at the point 31 prevents the ring from sliding along over the pole piece 28, so that the motion is one of rolling by one cylindrical surface along another. During at least a part of the return movement, pole 28 and the adjacent portion of ring 30 have the same polarity, during this time the spring 32 pushes the ring 30 over the pole piece 28, so that the inner surface of the ring slides over the lateral surface of the pole piece. As these actions are repeated, the motion of the ring accumulates into a rotation. If this rotation is to be taken off in the manner illustrated in Figs. 14 and 15, the ring may be prolonged beyond the end of the pole piece 28 and the transfer mechanism housed within the prolonged part, but obviously any convenient means of transferring the motion may be used, such, for example, as a roller or gear contacting with the outer surface of the cylinder.

The form illustrated in Figs. 8 and 9 includes a magnetic circuit 1 with a coil 2 and an air gap having two pole pieces 3 and 4 at right angles to each other as explained in connection with Fig. 1. A pair of brackets 35 are mounted upon the magnetic circuit and support a pair of disks 36. A shaft 38 is supported in the brackets 35 and the disks are mounted thereon to turn freely. If desired, the disks 36 may be made tight on the shaft 38 which may be journalled in the brackets 35. Hubs 39 extending inwardly from the disks 36 afford a fastening place for the ends of a helical spring 40. The ends of this spring may be attached securely to the hubs or they may frictionally grasp the same. A side of the spring contacts with the pole piece 3 intermediate the ends of the spring. The intermediate portion is free to move toward and from the pole 4 as the spring flexes. The spring 40 is made of magnetic material and will move toward the pole face 4 when the pull exerted by the flux is greater than the effective resistance of the spring. During this motion the flux attracts the spring against the pole face 3 and sliding between the spring 40 and the pole face 3 is hindered. During at least a part of the return movement the pole face 3 and the adjacent part of spring 40 have the same polarity and the spring slides along the pole face 3. The phase relations between the transverse oscillation of the spring and its sliding or rolling on face 3 are as explained in connection with Fig. 2. The edges of the disks 36 may serve to deliver this motion to external objects; particularly the disks may serve as traction wheels for a vehicle carrrying the device.

In Fig. 10, the magnetic circuit 1 and its coil 2 are duplicated by a magnetic circuit 43, and its coil 44, the member 45 being common to the two circuits and having a face 46 on which the rotor 47 can roll or slide. The support 48 holds two springs 49 and 50 which coact with the rotor 47 in a way already explained. The rotor 47 can be made to rotate in one direction or the other by energizing one or the other of the two coils.

In the form shown in Fig. 11, the magnetic circuit 1 and the coil 2 cooperate with the rotor 53 to produce rotation. This rotor is mounted in a yoke 54 manipulated by a handle working over a quadrant in a familiar way. The magnetic circuit carries a pair of springs 55 and 57 contacting opposite sides of the rotor. In the position illustrated the spring 55 cooperates with the rotor to cause the periodic flux to produce rotation thereof and the spring 57 is held away from the rotor by a projection on the yoke.

The rotor is capable of this motion because it is mounted loosely in its bearings, but if desired, it may be connected to the bearing by a spiral spring and an axle. This spring may be the spring hereinafter described in connection with Figs. 14 and 15, (and may be independent of the transfer of power if desired). One direction of rotation or the opposite is obtained from Fig. 11 by setting the rotor 53 against one or the other pole face 51 or 52 by means of the handle on the yoke 54.

When moved from the illustrated position in which it contacts face 52, into contact with face 51, the projection touching spring 55 becomes now nearly perpendicular to that spring and so moves it further from the center of the rotor and thus out of contact with the cylinder 53. The spring 55 is thereby moved past the edge of face 51 into a position similar to the illustrated position of spring 57. The projection, springs and part of the cylinder cooperating with the springs are nearer the observer in Fig. 11 than the edges of the pole faces. The cylinder 53 is preferably longer than the width of the pole faces.

In the form illustrated in Figs. 12 and 13 the invention is shown adapted to a sliding armature instead of a rolling one. The coil 2 is wound upon a central member 61 of a three-pole magnet. Upon the top of the central member there is provided a brass or other non-magnetic spindle 62 upon which a vibrator is mounted. The vibrator includes a pair of arcuate poles 63 and a connecting piece 64. Springs 65 are interposed between the connection piece and stops 66, which are provided by projections from the central member 61. Besides the pole at the top of the central member 61, the electromagnet has two poles 67 which have an arcuate cross-section as illustrated in Fig. 12. They are cylindrical on their outer faces in order to fit into a cylindrical casing, not shown. Their inner faces are shown as cylindrical to accommodate the coil 2. The rotor 68 is a circular disk of iron centrally mounted upon the spindle 62. As shown in Fig. 12, half of this member 68 has been broken away to show more clearly the parts beneath it and it is shown in section in Fig. 13.

In the operation of this form of the device, the coil 2 is supplied with alternating current which causes the poles 63 to induce poles in the member 68. Because of the hysteresis of the member 68, these poles are not always alike. The poles 67 attract the rotor 68 during that part of the cycle when the flux is large, and when the flux is zero or small, the vibrator 63 is returned by the springs 65. After a state of steady motion is attained, the portions of the cycle, when the vibrator is being driven by the springs, include more than when the polarity of the parts 63 is like that of adjacent portions of disk 68 than do the portions of the cycle when the rotor is moving in the opposite direction. When the polarity of rotor 63 and adjacent portions of rotor 68 are alike, disk 68 is driven by rotor 63, but when they are unlike vibrator 63 moves without much effect on disk 68, sliding between them to prevent much transfer of motion. This results in a cumulative rotation of the rotor 68 in a sense which is clockwise, as seen in Fig. 12.

In Figs. 14 and 15, I have illustrated the form shown in Fig. 1, together with provision for applying the power to closing a pair of contacts. The rotor 5 is a hollow cylinder, a shaft 70 being mounted by means of cheek plates 71 through the interior of the rotor. A spring 72, best shown in Fig. 15, is connected at one end to the shaft 70 and at the other end to one of the cheek plates 71 to bias the shaft to a definite position, and the device is to be used to rotate the shaft away from this position.

A helical spring 75 has a bigger radius at one end than at the other. At its larger end it is secured to the interior of the rotor 5 and at the other end it frictionally engages the shaft 70. When the rotor 5 is driven, the motion is counterclockwise as seen in Fig. 14 which has the effect upon the spring 75 of causing it to grip the shaft 70 more tightly. When the rotor is not being driven, the spring 72 returns the shaft to its original position. The motion of the shaft during such return results in loosening the spring 75 from the shaft 70. Motion of the shaft 70 counter-clockwise as seen in Fig. 14 moves the arm 76 toward the contact 77. The spring 72 acts to separate the contacts when the motor is not driving.

Although I have illustrated a number of modifications, it will be evident to those skilled in the art that many other modifications are possible and the limitation of the drawings and specification to a small number of modifications is not to be construed as a limitation. The invention sought to be protected by Letters Patent is stated in the following claims.

I claim as my invention:

1. In an electric motor, a magnetic circuit energized with periodic flux and having a polar surface, a rollable body of magnetic material supported adjacent said polar surface to roll relative thereto, the magnetic circuit having a point of attraction other than said polar surface, said body being biased away from said point, rolling toward said point under said attraction and returning under said bias.

2. A body of magnetic material, an intermittently magnetized member having a surface near said body, flux-producing means for causing flux to act on said body to move it across said surface, said means being inactive when said surface is not magnetized and other means to move the body in the opposite direction when the first means is inactive.

3. A body of magnetic material the shape of which renders it capable of rolling motion, magnetic structure having an intermittently magnetized surface, said body being supported on said surface against the pull of its magnetism, means for biasing said body in a certain direction, said pull coacting with the friction of said body against its support to cause the body to move relative to said surface and in opposition to said bias with a rolling motion when the surface is magnetized but to slide relative thereto under the influence of said biasing means at other times.

4. A body of magnetic material the shape of which renders it capable of rolling motion, magnetic structure having an intermittently magnetized surface, said body being supported on said surface against the pull of its magnetism, means for biasing said body in a certain direction, the friction of said body against its support acting to prevent sliding without rolling thereon when said pull is active and in opposition to said bias and being insufficient to prevent sliding under the influence of said biasing means when said surface is unmagnetized.

5. A magnetic circuit periodically energized and having an air gap, a rollable body of magnetic material near said air gap and moving to shorten the effective gap when the magnetic circuit becomes energized, means for biasing said body in a given direction, a surface on which said body rolls during said motion in opposition to said bias, the degree of pressure of said body on said surface being dependent upon the degree of magnetization of said magnetic circuit, said body engaging such surface insufficiently to cause rolling under the influence of said biasing means when said magnetic circuit is deenergized.

6. A magnetic circuit having pole cores defining an air gap, a round body of magnetic material in said gap and having rolling contact with a face of one of said pole cores, said magnetic circuit being periodically energized and said body moving by a rolling motion into a position to shorten the air gap during periods of magnetization and having a bias for returning the body during intervening periods of time.

7. A magnetic circuit having pole cores defining an air gap, a round body of magnetic material movably mounted in said gap and having rolling contact with a face of one of said pole cores, said magnetic circuit being periodically energized and said body moving by a rolling motion into a position to shorten the air gap during periods of magnetization, and spring controlled means for returning the body during portions of the periods when said magnetization is insufficient to overcome the effect of the spring means.

8. A magnetic circuit presenting two pole faces at an angle to each other and energized periodically, a magnetic body mounted to roll on one of said pole faces, said body being moved toward the other pole face when the magnetic circuit is energized and being prevented during said motion from sliding without rolling by the magnetic attraction of the pole piece on which it is mounted and a spring for moving the body toward its unattracted position.

9. An electric motor, comprising a magnetic circuit having an air gap, means for periodically energizing said circuit, a rotor contacting one side of said magnetic circuit at one side of the gap, a spring held away from the other side thereof, said rotor moving in opposite directions under the respective influences of the energized circuit and the spring, and means for communicating the movement of said rotor to objects to be driven by the motor.

10. An electric motor, comprising a magnetic circuit having magnetic poles defining an air gap, a rotor cooperating with a surface of one magnetic pole and magnetically attracted by a second pole to roll on said surface, means for biasing said rotor away from said second pole, and means associated with the rotor to cause its rotation to be transmitted to objects to be driven.

11. In an electric motor, a magnetic circuit, means for energizing the circuit with periodic flux, said circuit having a circular pole piece and an arcuate pole piece concentric therewith, an annular magnetic rotor surrounding the circular pole piece and loosely contacting the same, and a spring pressing said rotor toward the circular pole piece.

12. In an electric motor, a helical spring, intermittently acting means for rotating one part thereof step by step and constantly acting means for transmitting rotation from another part of the spring to the object to be driven, said two means being remote from each other along the spring whereby rotary movement may be stored in the spring.

13. In an electric motor, a magnetic circuit having pole pieces defining an air gap, means for energizing said circuit with periodic flux, said pole pieces being at an angle with each other, a magnetic helical spring with its axis through said gap parallel to said pole pieces and in contact with one of them, said spring being rotatably supported at its ends, the ends being far enough from said pole piece to permit the spring to travel on said pole piece by flexure of the spring in response to the attraction of the other pole piece, the contact of the spring with the pole piece causing rolling during said motion, the rotation incident to said rolling being communicated to the ends of the spring, and means at the ends to transmit the rotation to objects to be driven.

14. In combination, a magnetic circuit energized by periodic flux defining an air gap, a member associated with said air gap and moved by the flux when effective, said member being biased to oppose said motion, whereby it returns when the flux is ineffective, said magnetic circuit having a surface at one side of said air gap contacted by said member during its movement and over which said member slides during said return, the sliding being retarded by effective flux, whereby progressive relative movement is produced between said member and said surface.

15. In combination, a magnetic circuit energized by periodic flux, magnetic structures defining an air gap in said circuit, a member associated with said air gap and having a surface moved over the surface of a magnetic structure by the flux when effective, said member being biased to oppose said motion, whereby it returns when the flux is ineffective, one of the said surfaces in contact during said movement being a surface of revolution, sliding occurring along this surface during said return, sliding being hindered by said effective flux, whereby progressive movement of revolution of said surface is produced.

GEORGE C. ARMSTRONG.